Dec. 4, 1934.  V. LANCIA  1,983,472
SPRAG DEVICE FOR AUTOMOTIVE VEHICLES
Filed May 2, 1933
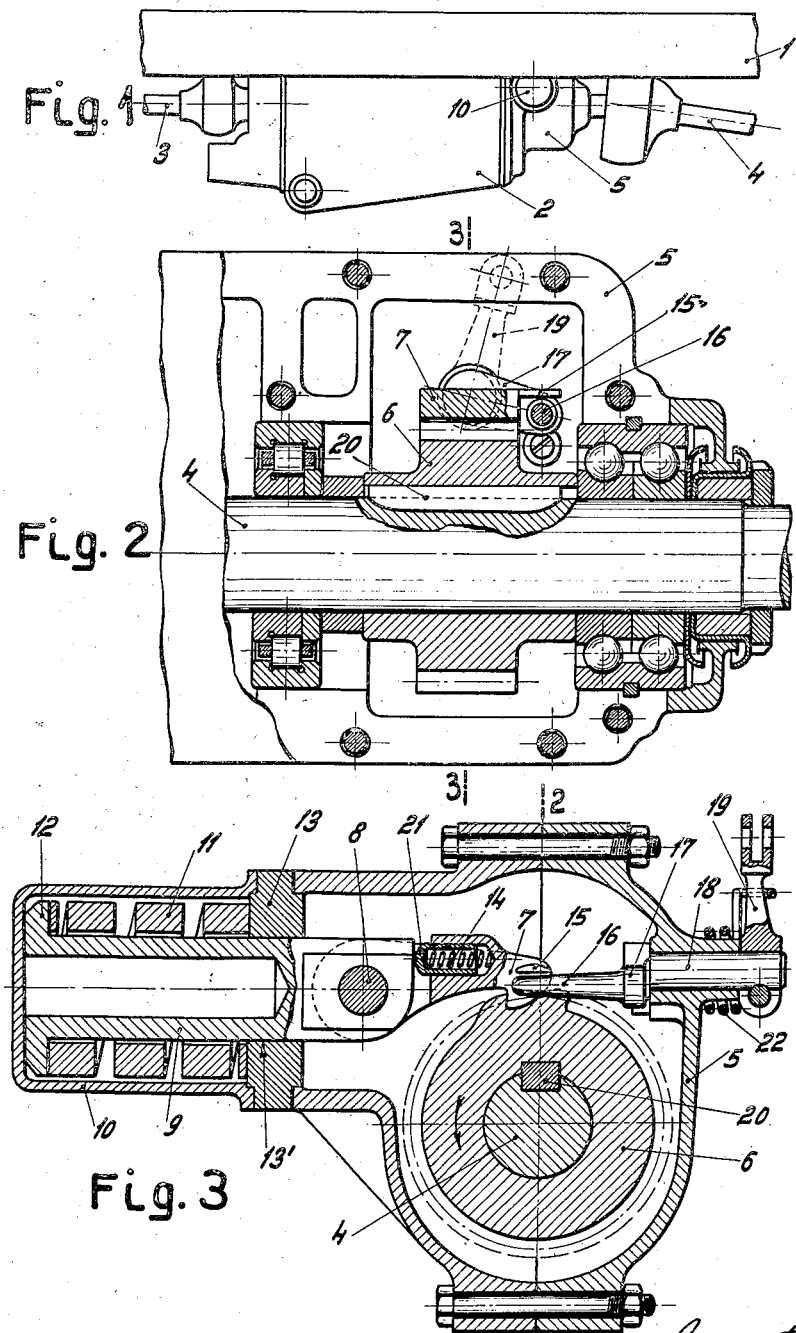
Inventor:
Vincenzo Lancia

UNITED STATES PATENT OFFICE 1,983,472

SPRAG DEVICE FOR AUTOMOTIVE VEHICLES

Vincenzo Lancia, Turin, Italy

Application May 2, 1933, Serial No. 669,056
In Italy May 10, 1932

7 Claims. (Cl. 188—30)

The present invention relates to sprag devices for automotive vehicles, that is to devices comprising pawl means adapted to engage a member of the transmission gear of the vehicle when said member tends to rotate in a reverse direction with respect to the direction it rotates during the normal operation and running of the vehicle; as known, such sprag devices are directed to prevent the back motion of a vehicle when it is climbing an ascent or an uphill and its engine is made inoperative through any reason, or generally when the vehicle is left under action of gravity in reverse direction without control of its propelling means and braking means.

The present invention has for its object a device of the above stated class in which the sprag pawl is mounted on the vehicle frame or generally on a stationary part fast on said frame, by means of a resilient member and more particularly by the cooperation of a spring member able to absorb the maximum work the vehicle may develop during its back motion until the vehicle wheels are skidding on the ground when the sprag action becomes evidently useless.

An embodiment of this invention is shown by way of example on the annexed drawing and Figure 1 is a fragmentary side view of a portion of the frame of a motor vehicle showing conventional parts of the power transmission line.

Figure 2 is a section of the device of this invention at an enlarged scale and on line 2—2 of Figure 3;

Figure 3 is a transverse section thereof on line 3—3 of Figure 2.

In Figure 1, 1 is a side bar of the frame of a motor vehicle, 2 is the change speed gear box, 3 is the shaft driven by the vehicle engine (not shown) and driving said change speed gears and 4 is the change speed driven shaft which drives a conventional differential gear and driving-vehicle-wheels, not shown.

As shown on the drawing, the box 2 of the change speed gear extends at its rear end to provide a casing 5 passed throughout by the speed change driven shaft 4. A ratchet pinion 6 is keyed by key 20 on said shaft 4 within said casing 5 and a pawl 7 is mounted within said casing 5 for engagement with ratchet pinion 6 as hereinafter described.

According to this invention, said pawl 7 is carried by member 9 mounted to move within a chamber 10 fast transversely on an opening of casing 5 which in turn is fast on change speed gear box 2 and therefore on the vehicle frame 1. Said member 9 is free to slide endwise through a bore 13' of a support and abutment plate 13 and is acted on by a spring 11 which abuts on an end collar 12 of member 9 and on said plate 13 which is fast intermediate casing 5 and chamber 10.

In the illustrated embodiment said pawl 7 is mounted on member 9 by means of a transverse pivot pin 8.

Pawl 7 is biased by a spring 14 located in a hollow plunger 21 and abutting on said pawl and on the front surface of member 9; said spring 14 acts to bias pawl 7 into its position illustrated in Figure 3 in engagement with teeth of ratchet pinion 6 while permitting its release when pinion 6 rotates in the proper direction for normal vehicle running, that is in counterclockwise direction, as shown by arrow in Figure 3.

Spring 11 has such a character in respect of its size, material and deformation it is free to carry out, as to be able to absorb the maximum work developed by the vehicle during the back motion without skid of the vehicle wheels.

Pawl 7 has a side lug 15 adjacent its free end and said lug 15 is adapted to be engaged by a finger 16 located thereunder; this finger 16 is solid with a crank arm 17 carried by a spindle 18 mounted to rotate in the wall of casing 5 and fast on a control arm 19 which may be actuated in any preferred manner and is provided with a return spring 22.

By the manipulation of arm 19 the pawl 7 may thus be removed from ratchet pinion 6 and held in its inoperative condition; on the contrary, said pawl 7 is in condition for cooperation with ratchet pinion 6 when arms 19 and 17 are in the position illustrated in Figures 2 and 3.

When the pawl 7 is in its operative position as illustrated, it does not prevent the counterclockwise rotation of pinion 6 and shaft 4 (as seen in Figure 3) for the vehicle drive, because said pawl 7 may oscillate around pivot pin 8 under the action of sloping leading faces of ratchet teeth.

On the contrary said pawl 7 engages teeth of ratchet pinion 6 and thus locks said pinion and shaft 4 solid therewith when said ratchet pinion 6 tends to move in reverse direction by effect of undesired back motion of the vehicle.

As understood, arm 19 is operated when reverse drive is desired, to remove pawl 7 from ratchet pinion 6 when operator desires to cause the vehicle to move back under his control.

Therefore, when a vehicle equipped with this invention is climbing an ascent or an uphill and accidentally the propelling action of the engine is cut off while the vehicle brakes are inoperative, on the vehicle starting to move back and down under gravity thus driving shaft 4 and ratchet pinion 6 in reverse or clockwise direction, said pawl 7 provides an interengagement between pinion 6 and the vehicle frame which prevents a free reverse rotation of pinion 6 and shaft 4, thus preventing the vehicle wheels from rotating and the vehicle from freely moving back in an uncontrolled manner.

Owing to the described resilient mounting of the pawl supporting member 9 by the intermediate of spring 11, the locking action of pawl 7 is not rigid and the vehicle back motion is prevented by means of a gradual locking action without shocks and injuries to device parts even in the case the engagement of pawl 7 with ratchet pinion 6 occurs when said ratchet pinion is moving with a certain speed with a material momentum owing to masses connected with it.

Further as the spring 11 is able to absorb the maximum work developed by the vehicle during its back motion, the sprag action is secured in improved manner up to the road slope or condition beyond which, the vehicle wheels being able to skid on the road, it is impossible to prevent such back motion by locking the vehicle wheel driving means.

It is to be pointed out that one of prominent features of this invention consists in the provision of a sprag device comprising a pawl which is connected with stationary parts by spring means which provide for gradual engagement and locking action of said pawl in cooperation with ratchet means.

Further, the described arrangement of spring means is also of advantage in that in the case the spring 11 is broken, its broken parts which stand between parts 12 and 13 always act to hold the pawl in operative position, thus holding the device in condition for satisfactory operation for the purpose it is directed to, irrespective of failure of spring means.

Of course, the illustrated and described embodiment is served merely for purpose of description and the device may be embodied in a number of different constructions within the spirit of appended claims; say, the parts 9 and 7 may be integral with each other and be supported for floating motion for the purpose of pawl operation by casing 10 and spring 11 and other cooperating parts, said spring 11 being also able to act for biasing said pawl in addition to resiliently carrying its tangential motion at stop.

What I claim and desire to secure by United States Letters Patent is:—

1. A sprag device for automotive vehicles comprising a shaft connected with the vehicle driving wheels for driving them, ratchet means on said shaft, a stationary part, a sprag pawl cooperating with said ratchet means, a member mounted to move in said stationary part along a path substantially parallel to a tangent to said ratchet means and carrying said sprag pawl, resilient means engaging said pawl carrying member with said stationary part, and means under manual operation for removing said pawl from the path of said ratchet means.

2. A sprag device for automotive vehicles comprising a shaft connected with the vehicle driving wheels for driving them, ratchet means on said shaft, a stationary part, a sprag pawl cooperating with said ratchet means, a member mounted to move in said stationary part along a path substantially parallel to a tangent to said ratchet means and carrying said sprag pawl, resilient means engaging said pawl carrying member with said stationary part, said resilient means becoming operative upon engagement of said sprag pawl with said ratchet means to resiliently brake and carry to stop the joint motion of said sprag pawl and ratchet means on the vehicle starting its back motion after their interengagement, and means under manual operation for removing said pawl from the path of said ratchet means.

3. A sprag device for automotive vehicles comprising a shaft connected with the vehicle driving wheels for driving them, ratchet means on said shaft, a stationary part, a sprag pawl cooperating with said ratchet means, a member mounted to move in said stationary part along a path substantially parallel to a tangent to said ratchet means and having said sprag pawl pivoted thereon, resilient means engaging said pawl carrying member with said stationary part, means biasing said pawl for engagement with said ratchet means, and means under manual operation for removing said pawl from the path of said ratchet means.

4. A sprag device for automotive vehicles comprising a shaft connected with the vehicle driving wheels for driving them, ratchet means on said shaft, a stationary part, a sprag pawl cooperating with said ratchet means, a member mounted to move in said stationary part along a path substantially parallel to a tangent to said ratchet means and having said sprag pawl pivoted thereon, resilient means engaging said pawl carrying member with said stationary part, said resilient means becoming operative upon engagement of said sprag pawl with said ratchet means to resiliently brake and carry to stop the joint motion of said sprag pawl and ratchet means on the vehicle starting its back motion after their interengagement, means biasing said pawl for engagement with said ratchet means, and means under manual operation for removing said pawl from the path of said ratchet means.

5. A sprag device for automotive vehicles comprising a casing, a shaft connected with the vehicle driving wheels for driving them, ratchet means on said shaft within said casing, a member mounted to move in said casing along a path substantially parallel to a tangent to said ratchet means, a spring engaging said member with said casing, cooperating positive abutting means on said casing and said member, a sprag pawl carried by said member for engagement with said ratchet means, and means under manual operation for removing said pawl from the path of said ratchet means.

6. A sprag device for automotive vehicles comprising a casing having a bored abutment, a shaft connected with the vehicle driving wheels for driving them, ratchet means on said shaft within said casing, a member mounted to move through said bored abutment of said casing along a path substantially parallel to a tangent to said ratchet means, a head on said member spaced from said abutment, a spring encircling said member and confined between said casing abutment and member head, a sprag pawl carried by said member for engagement with said ratchet means, and means under manual operation for removing said pawl from the path of said ratchet means.

7. A sprag device for automotive vehicles comprising a casing having a bored abutment, a shaft connected with the vehicle driving wheels for driving them, ratchet means on said shaft within said casing, a member mounted to move through said bored abutment of said casing along a path substantially parallel to a tangent to said ratchet means, a head on said member spaced from said abutment, a spring encircling said member and confined between said casing abutment and member head, a sprag pawl pivotally mounted on said member, means biasing said sprag pawl for engagement with said ratchet means, and means under manual operation for removing said pawl from the path of said ratchet means.

VINCENZO LANCIA.